United States Patent [19]

Hettinga et al.

[11] 4,379,170

[45] Apr. 5, 1983

[54] PROCESS FOR MANUFACTURE OF CHEESE

[75] Inventors: David H. Hettinga, Northbrook; Robert J. Wargel, Winnetka; Richard C. Tripp, Wheeling, all of Ill.

[73] Assignee: Kraft, Inc., Glenview, Ill.

[21] Appl. No.: 856,016

[22] Filed: Nov. 30, 1977

[51] Int. Cl.³ .......................... A23C 19/05; A23C 9/12
[52] U.S. Cl. ........................................ 426/40; 426/35; 426/42
[58] Field of Search .................. 426/34, 35, 36, 40, 426/42

[56] References Cited

U.S. PATENT DOCUMENTS

| | | | |
|---|---|---|---|
| 3,156,568 | 11/1964 | Hargrove et al. | 426/40 X |
| 3,975,544 | 8/1976 | Kosikowski | 426/42 X |
| 3,988,481 | 10/1976 | Coulter et al. | 426/36 X |

OTHER PUBLICATIONS

Silverman et al., Observations on Cheese Flavor Production by Pure Chemical Compounds, J. Da. Sci., vol. 36, 1953, (p. 574).
Kosikowski et al., Changes in Cheddar Cheese by Commercial Enzyme Preparations, J. Da. Sci., vol. 58, 1975, (pp. 963-970).
Jolly et al., A New Blue Cheese Food Material from Ultrafiltrated Skim Milk and Microbial Enzyme-Mold Spore Reacted Fat, J. Da. Sci., vol. 58, No. 9, 1975, (pp. 1272-1275).

*Primary Examiner*—David M. Nafe
*Attorney, Agent, or Firm*—Fitch, Even, Tabin, Flannery & Welsh

[57] ABSTRACT

A process is provided for the manufacture of cheese and cheese like products from an edible protein-fat-salts composition which is substantially free of fermentable sugars and in which the protein and salts are capable of forming a stable matrix for the fat. Milk protein is treated with a protease to hydrolyze the protein and to develop cheese flavor components and precursors therefor. The hydrolyzed milk protein is mixed with the protein fat-salts composition and the product is made into curd which is cured in an unusually short period of time to provide cheese or cheese-like products. Butter fat may also be treated with a lipase to hydrolyze the butter fat and to develop cheese flavor components and precursors therefor. The hydrolyzed butter fat is also mixed with the protein-fat-salts composition prior to making curd.

26 Claims, 2 Drawing Figures

PROCESS FOR MANUFACTURE OF CHEESE

The present invention relates generally to the manufacture of natural cheeses and more particularly, it relates to the manufacture of natural hard cheeses.

Natural cheeses have been made for hundreds of years from the milk of various animals and cheese making generally comprises taking milk, developing acidity and setting it with a clotting agent, such as rennet. The set milk is cut and whey is separated from the resulting curd. The curd is pressed and then curing usually takes place over a period of time under controlled conditions. Curing takes place over a relatively long period of time in the case of some cheeses. Various bacteriological organisms and/or enzymes are added to the milk and/or curd to obtain desired flavor development, thereby providing the various kinds and types of cheeses.

There are two generally recognized forms of natural cheese, namely the so-called hard cheeses, such as Cheddar cheese and Swiss cheese, and soft cheeses, such as Camenbert cheese and Limburger cheese. Both forms of cheese can be marketed as natural cheese, but they can also be cooked to make process cheese, cheese foods or cheese spreads. Various ways of making different types of cheese are indicated in the *Federal Standards for Cheese and Cheese Products,* Part 19, Title 21, Code of Federal Regulations, in *Cheese Varieties,* United States Department of Agricultural Handbook No. 54, and in various other well-known books and publications.

In conventional natural cheese manufacture, milk is introduced into a vat, and a starter organism(s) and rennet and/or other clotting agent are added to the milk. The starter organism(s) acts to develop acid and the rennet aids in clotting the milk. The organisms may also develop cheese flavor during curing. After a clot is obtained, the set milk is cut with curd knives or wires which promote the separation of whey from curd. The curd is then cooked and the whey is drained from the curd. With a number of cheeses, the curd is handled to develop acid and to promote the separation of whey as by stirring or cheddaring. The curd may then be placed in forms and pressed to further remove whey. The resulting blocks of curd may then be cured over a period of time under controlled temperature conditions to achieve the desired flavor of the cheese. This general method of manufacture of various natural cheeses has prevailed for several hundred years. It is time-consuming and requires a substantial storage period for a number of cheeses, and therefore space, to develop the desired flavor, body and texture. Further, conventional cheese manufacturing techniques result in loss of protein and therefore loss of yield.

Recently, alternate methods for the manufacture of cheese have been indicated for the purpose of reducing the time of manufacture of high flavored natural cheese. The use of higher curing temperatures and various organisms and enzymes have been suggested for more rapidly developing flavor, body and texture. In addition, the manufacture of soft cheeses has been proposed by the use of separation techniques in respect of the milk to remove moisture and lactose prior to the addition of microorganisms and rennet. However, these separation techniques have not disclosed the successful manufacture of hard cheeses having a high flavor in a short period of time. It should be noted that manufacturing techniques for specific types of cheese provide products which are quite uniform in body, texture and flavor. In other words, such techniques do not offer significant opportunity to provide widely varying characteristics.

In conventional cheese manufacture, it can take months to determine the final characteristics of the cheese and these characteristics, after hooping, are largely uncontrollable. Accordingly, the end product may be undesirable but such character maybe unknown for a substantial period of time.

The principal object of this invention is to provide an improved method for the manufacture of cheeses.

Another object of the invention is to provide a method for the manufacture of cheeses which provides high-flavored cheeses in a short period of time.

A more particular object of the invention is the provision of an improved method for the manufacture of hard cheeses with a high flavor in a short period of time.

A specific object of the invention is to provide cheese from milk in higher yield than is provided by conventional processes and to particularly provide hard cheeses in high yield.

An additional object of the invention is to provide a process which gives wide latitude in flavor and textural modification in the cheese making art.

A still further object of the invention is to provide a process which provides improved control over cheese characteristics.

Further objects and advantages of the invention will be apparent from the following description and accompanying drawings.

Figure 1:
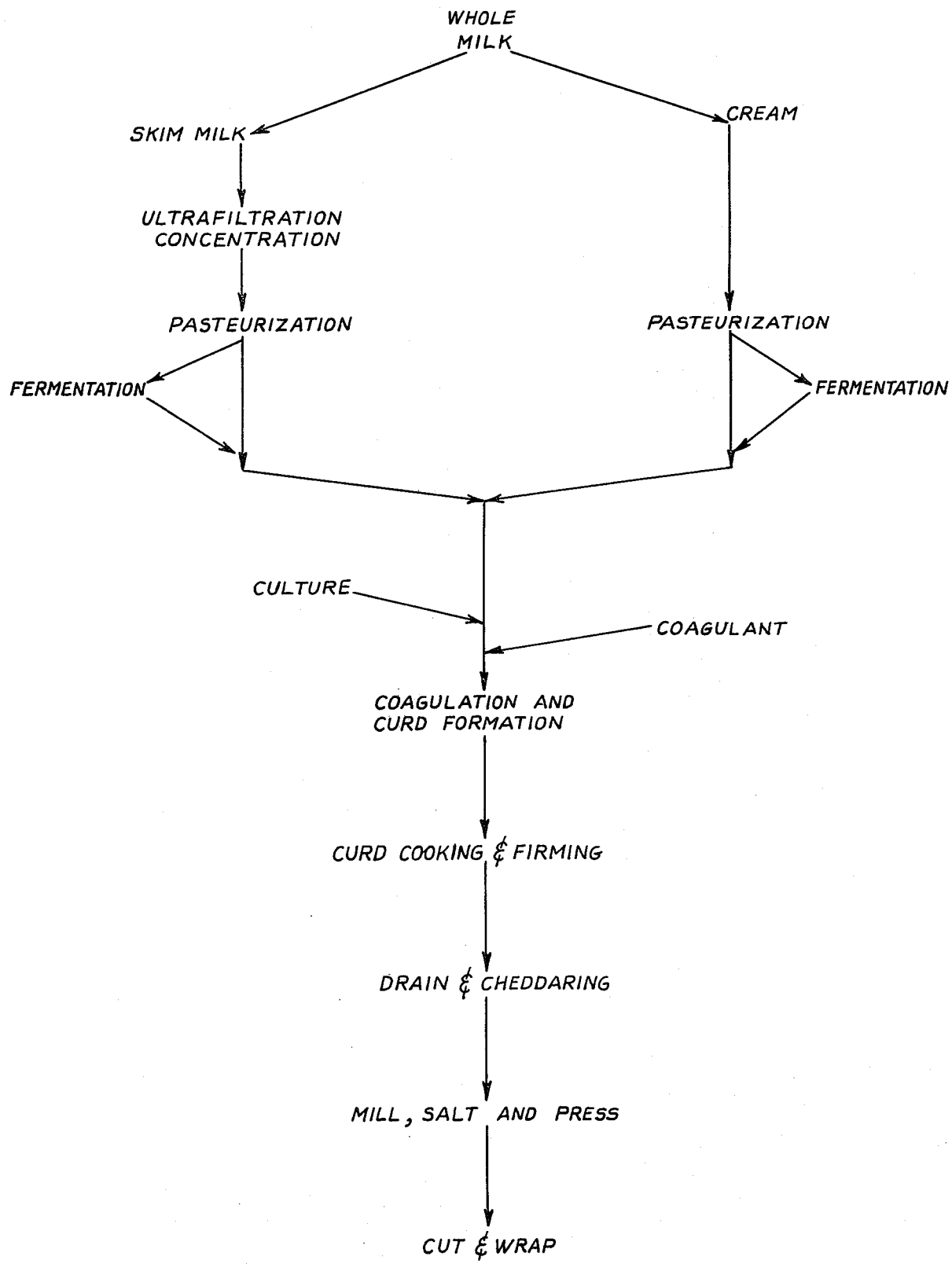
FIG. 1 is a flow sheet generally indicating a preferred method for the practice of the invention.

In its broadest aspect, this invention involves a process for the manufacture of cheese as well as cheese-like products. The process contemplates the use of an edible liquid protein-fat-salts composition as a substrate, which is substantially free of lactose and in which the protein, fat and salts are capable of forming a stable matrix and a desired cheese body and texture. For example, the process may be performed using milk from which lactose has been removed but may also be performed using a composition of liquid protein-fat-salts derived from various sources. At least a portion of the fat is desirably milk fat. The salts referred to herein will be in bound or unbound form relative to the protein. In the bound form, the salts will be complexed with protein.

In the process, a portion of edible protein is treated with a protease to hydrolyze the protein and develop cheese flavor components and precursors therefor, and the hydrolyzed protein is mixed with the non-hydrolyzed protein-fat-salt composition to an extent that the non-hydrolyzed portion of the protein comprises a major part of the protein in the mixture. At least a portion of butter fat may be treated with lipase to hydrolyze the fat to provide cheese flavor components and precursors therefor. After fat hydrolysis, it is mixed with the non-hydrolyzed protein-fat-salt composition. The mixture is then manufactured into cheese. The process thus differs from known cheese processes in that portions, rather than the whole, of the protein and milk fat are hydrolyzed to rapidly provide cheese flavor and precursors therefor. In this regard, it is particularly noted that cheese manufacture has traditionally required the presence of all protein and fat to achieve the desired body, texture and flavor.

More particularly, the preferred embodiment of the invention comprises the steps of using any raw or heat-treated milk which is traditionally employed in the manufacture of cheese, although it is important that the protein not be significantly heat denatured if heat treatment is employed. The milk is desirably separated to provide skim milk and cream. The skim milk is then treated to remove a major portion of the lactose, unbound salts, and water in the milk. Such removal can be accomplished by any of a number of known methods and procedures. A portion of the protein, preferably in a fluid condition, is isolated from the remainder and fermented to rapidly develop flavor components and precursors therefor under the most effective conditions, the fermentation being desirably effected with conventional cheese making organisms. At least a portion of the milk fat in the cream is treated with lipases commonly used in cheese making. The fermented or hydrolyzed portions of protein and fat, in a minor amount, are then combined with the unfermented skim milk concentrate and cream for further processing in the manufacture of the cheese. The fermented portions are referred to as fermentates from time to time hereinafter.

The concept of acting upon a portion, rather than the whole, of the milk protein and milk fat to effect rapid fermentation is a divergence from the traditional cheese making art. The use of fermentates having cheese flavor components and precursors therefor which, when added to a non-hydrolyzed protein-fat-salt composition, such as the milk concentrate, gives rapid development of cheese flavor, body and texture is also believed new to the cheese-making art. The approach in conventional cheese making has been that all of the protein and fat in the milk were uniformly treated in the manufacture of cheese, and the fermentation of minor portions of protein and fat to provide cheese flavor components and precursors therefor in traditional cheese making has not been known. The novel concept set forth herein further permits large latitude in flavor, body and texture modifications and also permits better control over the characteristics of the cheese in short time periods.

Further, it has not been known in conventional cheese making to provide a high flavor level in the milk prior to curd formation, and traditionally, such flavor development has primarily occurred over a substantial period of time during curing. The present invention thus provides many advantages in the rapid manufacture of highly flavored cheeses. In this connection, the organisms and enzymes are able to function under most favorable conditions to effect rapid and controlled proteolysis and/or rapid and controlled lipolysis.

Referring again to the process, the concentrated milk, mixed with a minor amount of the fermentates, is then set or coagulated after the addition of an acidifying agent, which may comprise the usual starter organisms used in cheese making or an acidogen, and of rennet and/or other clotting agent known to cheese making. After setting, the clotted or set milk is broken up, as by cutting, with knives or wires to facilitate separation of the curd and whey. The curd is then firmed, as by heating or cooking, and handled, as by cheddaring or stirring, to develop acid. The curd may then be salted and hooped for pressing. The curd can then be set aside for knitting and curing.

In a more preferred method for practicing the invention, as generally indicated in FIG. 1 of the drawings, whole milk is separated into skim milk and cream by conventional separation techniques. The skim milk is then treated and concentrated to remove a major portion of the lactose, unbound salts and water in the skim milk. This can be accomplished by ultra-filtration or by other alternate methods and procedures. To control bacterial development, the concentrate is subjected to pasteurization and a portion thereof, preferably in a fluid condition, is separated and then fermented to rapidly develop flavor components and precursors by breaking down the proteins under the most effective bacteriological conditions. The fermentation is desirably effected with known cheese making organisms and enzymes. The fermentate is then ready for further processing in the manufacture of cheese in accordance with this invention. The protein which is hydrolyzed need not come from the concentrated skim milk and may be an edible protein which is in various media and which, on fermentation, develops cheese flavor components and precursors therefor.

The cream portion recovered from the whole milk is pasteurized, as indicated in FIG. 1, in a conventional way and a minor portion of it may be fermented with enzymes, preferably lipase, or organisms which effect fat hydrolysis, to develop cheese flavor components and precursors therefor. After this minor portion is fermented, it can be returned to the major portion of the pasteurized cream for further processing in the manufacture of the cheese. The milk fat need not come from the cream derived from the whole milk, which was separated into skim milk and cream as earlier described, and the fat may be hydrolyzed in a media other than cream.

It should be noted at this point that the concentrated skim milk can be dried and the cream can be dried, or a homogenized mixture of the concentrated skim milk and the cream can be dried. The fermentates can also be dried. The dried products can later be reconstituted for the manufacture of cheese in the process to be hereinafter described. The dried products may also be utilized in other ways in the manufacture of cheese.

The pasteurized concentrated skim milk which has been combined with a fermented protein portion and the pasteurized cream which has been combined with the fermented fat portion may be mixed together to form a substrate for the manufacture of cheese. This is indicated in FIG. 1. An acidifying agent may be added to the substrate to more rapidly develop acid and this agent is usually normal starter organisms or culture used in cheese making but may be an acidogen. A small amount of coagulant is addd to promote clotting but because of the concentrated condition of the substrate, lesser amounts of coagulant are required than is used in normal cheese manufacture. Upon coagulation or setting of the substrate, it is cut with knives or wires to promote curd and whey separation. The curd is then held in the whey at an elevated temperature to promote firming and, after draining, is handled as by cheddaring or stirring. The curd is then milled, if cheddared, and salted and can be hooped for pressing. After pressing, the curd rapidly knits and results, in a few days, in a natural cheese which has a high flavor, characteristic of that of cheese several months old. As indicated in FIG. 1, the cheese is cut and wrapped. The cheese can also be used in the manufacture of process cheese, cheese foods, or cheese spreads.

To be more specific as to the invention, the invention contemplates the manufacture of cheese from an edible liquid protein-fat-salts composition with protein being present at a level between about 35 percent and 80 percent and fat being present at a level between about 25 percent and about 55 percent. The fat should have an iodine value of more than about 70. The salts are present in kinds and amounts to cause the protein to provide a stable matrix for the fat and to finally provide the desired body and texture in the cheese. At least 5 percent of the salts are in combined form, i.e. complexed with the protein. At least 2 percent of fermentable sugars, such as lactose, is desirably present in the protein-fat-salts composition. The percentage is determined on a dry bases.

A major portion of the protein should be in micellar form and should not be significantly heat denatured. If the protein is not in micellar condition, the matrix is difficult to obtain and it is a problem to obtain the desired cheese characteristics. It is recognized that the protein may be converted into a micellar condition by known means.

The desired edible liquid protein-fat-salts composition can be prepared in a number of ways, as by ultrafiltration of milk to provide a retentate, as by centrifugation, by combining caseinates, salts and fat and by removal of salts and lactose from dried milk. The composition is balanced to finally provide a stable matrix which will give the body and texture of cheese, which will hold the fat in the composition, and which will rapidly develop cheese flavor.

The protein may be of animal or vegetable origin but should not be heat denatured or otherwise treated to such extent as to affect its ability to form, with the salt, the stable matrix.

The protein is fermented with usual cheese-making microorganisms and/or proteases to provide desired flavor components or precursors therefor. Between about 5 percent and about 50 percent of the protein is fermented or hydrolyzed and the fermented protein is added to the unfermented protein.

The protein is fermented until the hydrolysis products provide trichloroacetic acid (TCA) soluble tyrosine in an amount of between about 500 and about 3000 micrograms per milliliter, and preferably in an amount between about 600 and 1500 micrograms per milliliter. The fermentation basically converts the large casein molecules to small molecular weight proteins, peptides and amino acids which provide the cheese flavor components and precursors therefor. If excessive hydrolysis occurs, there is too much body breakdown and bitterness develops in the end product. Insufficient breakdown limits rapid flavor development and provision of cheese having the desired body and texture characteristics.

The milk fat is fermented with the usual cheese-making microorganisms and/or lipases to provide desired flavor components and precursors therefor. Less than all of the fat may be fermented and added to the unfermented fat. The fat may be of animal or vegetable origin. However, at least 5 percent of the fat should be milk fat for the manufacture of chedar and American-type cheeses.

The hydrolyzed and non-hydrolyzed protein, with salts in desired amount, and the hydrolyzed and non-hydrolyzed fat, are combined in an aqueous system with moisture being present at a level of from about 35 percent to about 90 percent. A coagulant, such as rennet, is added to set the curd. Cultures, which are normal in cheese manufacture, are added to the system and acid development is allowed to occur. The curd is cut and firmed to expel whey and may be stirred out or cheddared.

By reason of the concentration step, the process retains proteins which are normally lost in the whey in conventional cheese manufacture so that a high yield is provided, and the process permits development of cheese flavor, body and texture much more rapidly than in heretofore known methods for making cheese.

EXAMPLE 1

Figure 2:
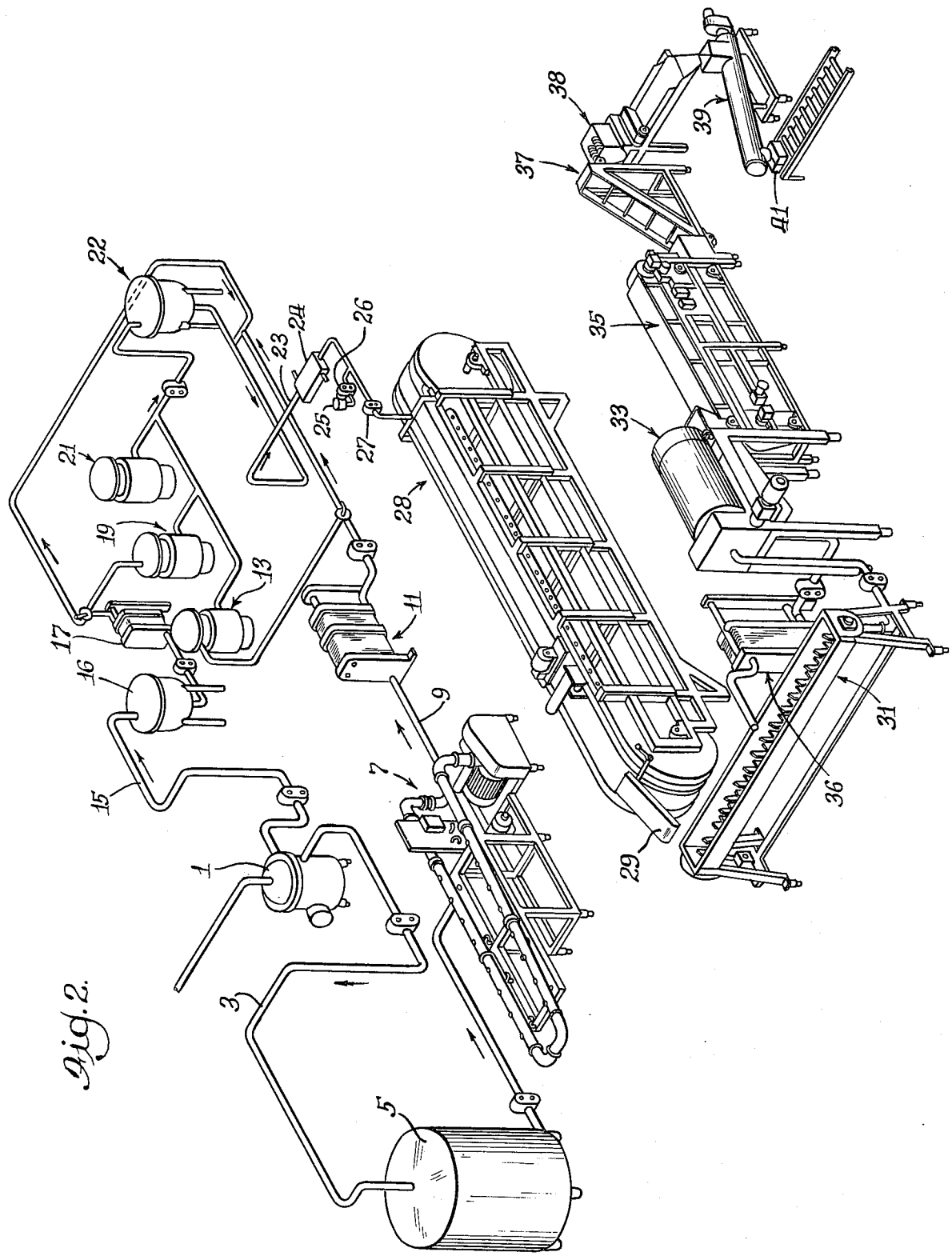
FIG. 2 is a perspective view of equipment for carrying out the process of the invention in accord with the process disclosed in FIG. 1.

In accordance with one example for the practice of the invention, reference should again be made to FIG. 1 which is a flow sheet for the rapid manufacture of cheddar cheese. Reference should also be made to FIG. 2 which illustrates apparatus for making cheddar cheese. As indicated in the flow sheet, whole row cow's milk was taken which had a total bacterial count of 50,000 per milliliter, a solids content of 12.5 percent and a milk fat content of 3.6 percent. 2,000 pounds of the milk were separated in a DeLaval separator 1 into 1850 pounds of skim milk and 150 pounds of cream having milk fat content of 50 percent. The skim milk was pumped through a line 3 into a tank 5. The skim milk had the following analysis:

Total Solids—8.80%
Ash (25% CA-PO$_4$)—0.70%
Lactose—4.60%
Butterfat—0.08%
Protein—3.30%
Sodium—0.046%
Potassium—0.130%
Calcium—0.117%
Phosphate—0.089%
Chloride—0.190%

In order to effect removal of water, salts and lactose, the skim milk was fed into an ultrafiltration unit 7 which comprised one module and which was a 10 POR System manufactured by Dorr-Oliver, Incorporated. The ultrafiltration unit included a membrane cartridge (not shown) MPX-24. The ultrafiltration unit 7 provided a permeate of water, unbound salts and lactose as a by-product of the process. The permeate comprised 94.5 percent water, 0.5 percent unbound salts.

The permeate from the ultrafiltration unit 7 had the following analysis:

Total Solids—5.70%
Ash—0.50%
Lactose—4.60%
Butterfat—0.02%
Protein—0.30%
Sodium—0.048%
Potassium—0.127%
Calcium—0.028%
Phosphate—0.038%
Chloride—0.20%

The ultrafiltration unit also provided a concentrate which comprised 77.0 percent water, 15.0 percent protein, 0.7 percent bound and unbound salts, of which about 80 percent was bound and about 20 percent was unbound, 4.7 percent lactose and 0.2 percent milk fat. As a result of the ultrafiltration, the skim milk was concentrated in a 5:1 ratio, permeate to concentrate, and thereby effected the removal of a major portion of water, unbound salts and lactose. The ultrafiltration unit 7 was operated with a membrane having a pore size which will retain materials having a molecular weight greater than about 24,000.

The concentrate from the ultrafiltration unit 7 was passed through a pipe 9 into a high-temperature short-time (HTST) pasteurizer 11 (DeLaval) which heated the concentrate to 161° F. for 20 seconds and which then cooled the concentrate to exit from the pasteurizer 5 at 40° F.

A 10 percent portion of the pasteurized concentrate was subjected to proteolysis in a fermentor 13. In this connection, the concentrate portion was heat treated at 180° F. for 30 minutes to substantially sterilize it, cooled to 110° F. in apparatus not shown, and fermented with 40 ppm of a protease enzyme available commercially as Rhozyme P-11 (Rohm & Haas, Philadelphia, Pa.) and an 8 percent inoculum of a Micrococcus sp. ATCC No. 21829 (10% NFDM, $6.5 \times 10^7$ cells per gram) for 5 hours. The fermented product was cooled to 45° F. and stored at about 45° F. until used. These fermenting materials have been used in cheese manufacture heretofore.

The proteolyzed portion of the concentrate developed flavor materials including precursors. The extent of proteolysis was characterized as follows: Hydrolysis products equal to 750 micrograms of TCA soluble tyrosine per milliliter of fermentate. The proteolyzed skim milk portion was cooled to 45° F. and stored at 45° F. until used.

The cream exited from the separator 1 through a line 15 into a cream tank 16, whereupon it was pasteurized in an HTST pasteurizer 17 at 165° F. for 20 seconds. A portion of the pasteurized cream (50 percent milk fat) in an amount of about 10 percent by volume was fed to a cream fermentor 19 in which it was pasteurized (180° F., 15 minutes), adjusted to 110° F. and fermented with 300 ppm each of lipases Italase C and Capalase KL (Dairyland Food Laboratory, Inc., Waukesha, Wis.) for 5 hours. These enzymes are well-known in cheese manufacture. The fermented product was cooled to 45° F. and stored at 45° F. until used. The lipases resulted in the production of fatty acids having the below indicated carbon chain lengths in the indicated percentages as a percentage of the cream portion:

| $C_2$ | $C_4$ | $C_6$ | $C_8$ | $C_{10}$ |
|---|---|---|---|---|
| 0.0016% | 0.0523% | 0.0219% | 0.0068% | 0.0113% |

A conventional cheese making culture was prepared in the culture fermentor 21. The culture comprised the following at the indicated levels: A commercial cheese starter culture, Hansen H 188, comprising *Streptococcus lactis* and/or *Streptococcus cremoris* in a 10 percent nonfat dry milk, $5.3 \times 10^8$ cells per gram was added to an 8 percent level.

In the system shown in FIG. 2, the skim milk fermentate from the fermentor 13, the cream fermentate from the fermentor 19, and the culture from the culture fermentor 21 are combined and pumped into a hold tank 22, and held at a temperature of about 45° F. with mild agitation.

The fermentates and culture were mixed with streams of skim milk concentrate and cream in pipe 23 and the blend passed into a heat exchanger 24. The blend was heated to a temperature of about 102° F. and had a pH of 6.55.

The mixture of cream, skim milk concentrate, fermentates and culture, when blended together comprised the following, at the indicated levels:

Total Solids—27.5%
Protein—10.4%
Lactose—1.3%
Ash—3.9%
Fat—11.9%
Sodium—0.047%
Potassium—0.135%
Calcium—0.299%
Phosphate—0.661%
Chloride—0.150%

Rennet (Hansen single strength (40×dilution with water)) was fed from a tank 25 by pump 26 and introduced by injection into the stream in pipe 23. Then the blend with rennet was fed through a mix pump 27.

A continuous heating, coagulating and cutting belt unit 28 received the final mixture which sets or coagulates and is thereafter cut into curd particles. The curd remained in the unit 28 for about 2½ minutes and at a temperature of about 102° F. The curd particles were discharged from the continuous unit 28 out of a spout 29 which fed into a cooking tank 31 containing whey which was initially prepared from dried chedder whey commercially available.

The curd particles remained in the cooking tank 31 for about 10 minutes and the solution in the cooking tank had a temperature of about 102° F. After cooking, the curd and whey were discharged into a rotary draining unit or trommel 33, which separated the whey from curd. The trommel 33 rotated the curd for 2½ minutes before discharge at a pH of 6.12 into a continuous cheddaring unit 35 in which the curd matted and was effectively cheddared. The cured particles from the trommel analyzed as follows:

Total solids—35.5%
Ash—1.51%
Lactose—3.0%
Protein—13.5%
Fat—17.5%

The salts had the following analysis:
Sodium—0.048%
Potassium—0.105%
Calcium—0.385%
Phosphate—0.796%
Chloride—0.120%

The whey was recycled to the cooking tank through a heat exchanger 36 in order to maintain its temperature at about 102° F. The whey had the following analysis:
Total Solids—9.0%
Ash—0.66%
Lactose—4.5%
Butterfat—1.3%
Protein—2.5%
pH about 6.2
Sodium—0.067%
Potassium—0.138%
Calcium—0.155%
Phosphate—0.154%
Chloride—0.130%

From the cheddaring unit 35, the curd was moved via a conveyor 37 at a pH of 5.32 into curd mill 38 which functioned to mill the curd. The milled curd had a pH of 5.22 and had the following analysis:
Total Solids—54.2%
Ash—2.2%
Lactose—1.9%
Butterfat—28.2%
Protein—21.95%
Sodium—0.038%

Potassium—0.085%
Calcium—0.603%
Phosphate—1.368%
Chloride—0.12%

The milled curd was fed to a mixing drum 39 in which salt (NaCl) was mixed with the curd at a level of 3 percent by weight. The curd exited from the mixing drum 39 at a temperature of 94° F. and was analyzed and found to contain the same amount of constituents as cheddar cheese produced by conventional make procedures except that more than 80% of the milk's original protein was recovered as compared to 70% protein recovery in conventional cheddar cheese make procedures.

Although the curd from the mixing drum 39 could have then been dried in a rotary dryer (not shown), it was instead packed into hoops 41 for pressing overnight in accordance with conventional cheddar cheese manufacturing practice. In this example, about 45 pounds of curd were filled into each hoop 41 and then pressed. The cheese had a pH of 5.11.

The cheddar cheese had at the end of 10 days, characteristics of cheddar cheese made by conventional make procedure which had been aged 4 months. The body and texture of the cheese was broken down to a degree typical of cheddar cheese of such age. The cheese had a yield increase, based upon the entering milk protein, of about 10% over the manufacture of cheddar cheese by conventional make procedure. The cheese had the following analysis:
 Total Solids—64.3%
 Ash—4.3%
 Lactose—
 Butterfat—32.0%
 Protein—25.2%
 Sodium—0.763%
 Potassium—0.078%
 Calcium—0.732%
 Phosphate—1.532%
 Chloride—1.230%

EXAMPLE 2

In accordance with this example of the practice of the invention, a Swiss or Emmental flavored cheese product was produced. The procedure of Example 1 was generally followed except that the portion of skim milk concentrate was heat treated (180° F., 30 min.), adjusted to 110° F. and 0.05% proline was added. The mixture was fermented with 80 ppm of Rhozyme P-11 (protease) and 6.6% inoculum of a 50/50 mixture of Propionibacteria P16 and P20 (G-broth, $6.2 \times 10^9$ cells per gram of P16, $1.2 \times 10^9$ cells per gram of P20) for 5 hours. The fermentate was cooled to 45° F. and stored at this temperature until used.

The fermentate had 744 micrograms of TCA soluble tyrosine per milliliter.

The cream was pasteurized, as in Example 1, and 2% of the cream by volume was fermented in accordance with Example 1.

The fermentates from the skim milk concentrate and from the pasteurized cream were mixed with the pasteurized skim milk concentrate and pasteurized cream. The mix had the following analysis:
 Total Solids—24.40%
 Protein—10.00%
 Fat—9.11%
 Ash—1.32%
 Calcium/Protein—0.0258
 Phosphate/Protein—0.0651
 Calcium—0.257%
 Phosphate—0.651%
 Sodium—0.052%
 Potassium—0.150%
 Chloride—0.30%
 Phosphate/Calcium—2.52

The culture which was added to the fermentates of Example 1 comprised the following organisms in the indicated amounts:
*Streptococcus thermophilus*—8.0%
*Lactobacillus bulgaricus*—0.002%

The rennet was added, as in Example 1, and the mixture was coagulated and cut in the unit 28. The curd particles were discharged from the continuous unit 28 out of the spout 29 which fed into the cooking tank 31 containing whey at a temperature of 124° F. The curd remained in the cooking tank for approximately 20 minutes.

After cooking, the curd was fed into the trommel 33, thereby separating the whey from curd. The curd was rotated for 2½ minutes and discharged directly into 40 pound hoops 41. The curd from the trommel had the following analysis:
 Total Solids—43.51%
 Protein—20.77%
 Fat—17.5%
 Ash—2.23%
 Calcium—0.520%
 Phosphate—1.347%
 Sodium—0.043%
 Potassium—0.097%

The hooped curd was allowed to ferment for approximately 6 hours, maintaining a temperature of at least 100° F. for this period. At the end of the fermentation, the curd pH was approximately 5.0. The cheese had the following analysis:
 Total Solids—54.38%
 Protein—26.71%
 Fat—24.0%
 Ash—2.71%
 Calcium/Protein—0.0252
 Phosphate/Protein—0.0629
 Calcium—0.676%
 Phosphate—1.681%
 Sodium—0.039%
 Potassium—0.079%
 Chloride—0.14%
 Phosphate/Calcium—2.49

The 40 pound blocks of cheese were immersed in saturated brine for 24 hours at 45° F.

A salt and flavor equilibration period of 30 days resulted in a cheese which was equivalent in flavor to 3 month old Swiss cheese manufactured by conventional processes.

EXAMPLE 3

In accordance with this example, a Romano flavored cheese product is prepared and the procedure of Example 1 is followed except that 100 percent of the cream is fermented for 24 hours with the lipases, at a temperature of 98° F. The fatty acids are present, for the indicated carbon chain lengths, at the below specified percentages.

| $C_2$ | $C_4$ | $C_6$ | $C_8$ | $C_{10}$ |
|-------|-------|-------|-------|----------|
| .1031% | .175% | .063% | .014% | .008% |

The skim milk concentrate portion is treated as in Example 1 except 82 ppm of Rhozyme P11 is used and the fermentate reached an endpoint of 1200 micrograms of TCA soluble tyrosine per milliliter.

The fermentates are combined with the skim milk concentrate, and blended together. A culture of *Lactobacillus bulgaricus* and *Streptococcus thermophilus* are added in the mixture at levels of 0.002 percent and 7.0 percent, respectively.

The mix had the following analysis:
Total Solids—23.78%
Protein—10.36%
Fat—8.05%
Ash—1.35%
Calcium/Protein—0.0251
Phosphate/Protein—0.0621
Calcium—0.265%
Phosphate—0.644%
Sodium—0.055%
Potassium—0.152%
Chloride—0.21%
Phosphate/Calcium—2.42

The mixture is placed in the unit 28 and discharges out of spout 29 which feeds into a cooking tank 31 containing whey.

The curd remains in the cooking tank for about 20 minutes and the solution of the cooking tank has a temperature of 124° F. The curd out of the trommel 33 had the following analysis:
Total Solids—43.95%
Protein—20.20%
Fat—19.0%
Ash—2.16%
Calcium—0.470%
Phosphate—1.250%
Sodium—0.045%
Potassium—0.099%
Chloride—0.17%

After being processed in the cheddaring unit 35, as in Example 1, the curd is milled and salted. The salt, however, is added at a level of 5 percent. The salted mixture is hooped and pressed. At the end of 30 days, a tight, firm, cheese body is produced and a cheese product having the flavor of 3 month Romano cheese results. The cheese had the following analysis:
Total Solids—67.57%
Protein—31.00%
Fat—28.1%
Ash—5.56%
Calcium/Protein—0.256
Phosphate/Protein—5.92
Calcium—0.794%
Phosphate—1.839%
Sodium—1.178%
Potassium—0.057%
Chloride—1.91%
Phosphate/Calcium—2.32

EXAMPLE 4

In accordance with this example, the skim milk concentrate from the ultrafiltration unit 7 was dried and subsequently reconstituted. In this connection, the skim milk concentrate, prepared in accordance with Example 1, was introduced into a Bowen dryer at a concentration of 22 percent total solids. The drying is accomplished with the skim milk concentrate entering the dryer at 40° F. through a Spraying Systems nozzle Model 74-20 with high pressure atomization at 2500 psi. The dryer, which utilized an inlet air temperature of 350° F. and an outlet air temperature of 175° F., discharged product having a temperature of 120° F. and a moisture level of 4.5 percent. There was no significant heat denaturation of the protein. The product readily dried and was stored. Subsequently, 420 pounds of the dried product was mixed with 1580 pounds of water, thereby reconstituting the skim milk concentrate. This reconstituted skim milk concentrate was then processed in accordance with Example 1 and the cream with the added cream fermentate was mixed with the blend of reconstituted skim milk concentrate and fermented skim concentrate prepared as in Example 1.

The resulting cheddar cheese had the texture and flavor of the product of Example 1. This example illustrates how the process of the invention can be used to handle a milk surplus by concentrating, drying and storing of the concentrate.

EXAMPLE 5

Dried skim milk concentrate is prepared in accordance with Example 4. Dried cream is purchased on the market, the product being bought under the tradename BEATREME. The dried skim milk concentrate is reconstituted in the manner set forth in Example 4 and a portion is fermented as in Example 4. The dried cream is reconstituted with water, the ratio of water to dried cream is 0.6:1. 5 percent of the reconstituted dried cream is fermented with lipases as in Example 1 and recombined with the reconstituted cream. These reconstituted and combined materials are mixed together and processed like the mixture in Example 1. The resulting product is a cheddar cheese having a moisture content of 38% with a close-knit body and an American-type cheese flavor.

EXAMPLE 6

Dried skim milk concentrate is prepared in accordance with Example 4. Skim milk concentrate from the ultrafiltration unit 7 is fermented in accordance to Example 1 and the fermentate is introduced into the Bowen spray dryer of Example 4 at a concentration of 23 percent. The fermentate is dried as set forth in Example 4. The dried skim milk concentrate and the dried skim milk fermentate are combined and blended in a ratio of 8:1, and stored. After storage, 425 pounds of the blend are mixed with 1425 pounds of water, thereby reconstituting the dried products. This reconstituted blend is then processed in accordance with Example 1, excepting the skim milk fermentation step, and the cream with the added cream fermentate are mixed with the blend of reconstituted blend.

The resulting cheddar cheese has the texture and flavor of the product of Example 1. This example illustrates how the process of the invention can be adapted so as to facilitate transporting of the blend of dried concentrate and dried proteolyzed fermentate to any location.

EXAMPLE 7

In accordance with this example, the skim milk concentrate from the ultrafiltration unit 7, the proteolyzed concentrate from fermentor 13, the cream from the pasteurizer 17, and the lipolyzed cream from fermentor 19 are combined in accordance with Example 1 and spray dried in accordance with the conditions in Example 4. The product readily dries and is stored. After storage, the product is reconstituted with water to 30 percent total solids and is then processed in accordance with Example 1.

The resulting cheddar cheese product has the texture and flavor of American-type cheese. This example illustrates how the process of the invention can be adapted to facilitate transport of the products of the invention to any location where manufacturing equipment is available at a lower cost due to the reduction in volume.

EXAMPLE 8

In accordance with this example, whole raw cow's milk is taken as set forth in Example 1 and fed into an ultrafiltration unit 7 for removal of permeate. The whole milk is concentrated in a 4:1 ratio and, thereby, effects the removal of a major portion of water, unbound salts and lactose. The concentrate from the ultrafiltration unit 7 is passed into a high-temperature short-time (HTST) pasteurizer 11 which heated the concentrate to 161° F. for 16 seconds, and the milk exits at 40° F.

A 10 percent fraction of the pasteurized concentrate is subjected to proteolysis and lypolysis under conditions and enzyme-culture amounts, as set forth in Example 1, but in one fermentor. After fermentation, the fermentate is recombined with the whole milk concentrate and cheese is made.

The resulting cheddar cheese has texture and flavor similar to the product of Example 1 and this example illustrates how the process of the invention can be adapted to handle whole milk without the need for separation of skim milk from cream.

EXAMPLE 9

In accordance with this example, a Colby cheese is prepared and the procedure of Example 1 is followed except 3 percent of the skim concentrate is fermented with the enzymes and cultures of Example 1, and then recombined with the unfermented concentrated skim milk. The curd particles are cooked to 102° F. in cooking tank 31 and are discharged onto a conventional drain table. At this point, the procedure does not provide for the continuous manufacture of cheese, and follows the conventional steps in Colby cheese manufacture on a batch-type basis. The curd is maintained at 102° F., under whey, for one hour to allow for an increase in curd firmness, whey expulsion and lactic acid development. After one hour, the whey is drained and the curd is dry stirred for an additional one hour on the drain table to allow for additional lactic acid development. At this time, 87° F. water is added and the curd is submerged, under water, for 10 minutes. The water is drained, the curd is dry stirred for 10 minutes and salt is applied at a level of 2 percent and mixed with the curd. The salted curd is hooped and pressed as in conventional practice. A Colby cheese resulted, in 7 days, having the flavor and texture of aged Colby cheese produced by conventional make procedures.

EXAMPLE 10

In accordance with this example, a body-type cheese for processing was prepared and the procedure in Example 1 was generally followed except (a) the skim milk was homogenized at 4000 psi, in single stage, to disperse agglomerated whey protein, (b) no cream was fermented, and (c) only 40 percent of the cream, by volume, was recombined with the concentrated skim. A low fat (20 percent fat dry basis) firm textured cheese resulted which could be processed within 1 to 3 days after make, imparting added "body" character to process cheese. If the cheese is held more than 5 days after manufacture, an aged texture results.

The aforementioned procedure, as set forth in this example, provides for the manufacture of body-type cheese and incorporates additional whey protein as set forth in this invention.

EXAMPLE 11

In accordance with this example, a cheese is prepared and the procedure of Example 1 is followed except a non-creamed cottage cheese curd (18% total solids) is thoroughly macerated in a Mince Master (Griffith Laboratories, Inc.,), heated to 180° F. for 30 minutes, and cooled to 110° F. to prepare the proteolyzed fermentate. The enzymes and cultures are added, and conditions of fermentation in accordance with the preparation of proteolytic fermentate of Example 1 are followed. This cottage cheese curd proteolytic fermentate is combined with ultrafiltrated concentrated skim milk, cream, cultures, and lipolytic fermentate, and processed according to Example 1.

The resulting cheese has flavor and texture like the product of Example 1 and this example illustrates how the process of the invention can be adapted to utilize a concentrated protein source other than that obtained from the ultrafiltration process in the preparation of a fermentate.

EXAMPLE 12

In accordance with this example, a product resembling cheddar cheese was prepared and the procedure of Example 1 is followed except in the preparation of the skim milk concentrate. Calcium caseinate powder (New Zealand Milk Products Corp., New Zealand) is reconstituted with water to 10 percent total solids, heated to 180° F. for 3 minutes, cooled to 110° F. and concentrated in the ultrafiltration unit 7 to 15 percent total solids. An equal volume of water is added to the calcium caseinate concentrate at 110° F. and the mixture is returned to the ultrafiltra-filtration unit 7 and again concentrated to 15 percent total solids. The purpose of the diafiltration is to remove excess unbound calcium ions. The calcium caseinate concentrate is homogenized (Manton-Gaulin Corp. homogenizer) at 5000 psi, single stage to disperse proteins, heated to 180° F. for 3 minutes, cooled to 45° F., and stored until used. The calcium caseinate concentrate is combined with cream, proteolytic fermentate, lipolytic fermentate, and culture, and processed in accordance with Example 1. A cheese-like product results having cheddar cheese flavor, texture and body.

EXAMPLE 13

In accordance with this example, a product resembling cheddar cheese is prepared by substituting 20 percent of the ultrafiltered concentrated cow's milk protein with a soy protein concentrate (Isolate 972, from Kraft, Inc., Coshocton, Ohio).

A separate skim milk concentrate is fermented and combined with soy-cow's milk concentrate and is processed in accordance with Example 1.

The resulting cheese has the flavor and texture like American-type cheese. This example illustrates how proteins from other sources can be substituted for those obtained from cow's milk.

EXAMPLE 14

In accordance with this example, a product resembling cheddar cheese is prepared by substituting 90 percent of the cow's milk fat with liquid corn oil (Staley's liquid refined, dewaxed, deodorized corn oil) or coconut oil (Humko's Victory 76, partially hydrogenated refined coconut oil). In each case the oil used is heated to 125° F., and combined with the ultrafiltrated concentrated skim milk and blended in a single stage homogenizer (Manton-Gaulin Corp. homogenizer) at 500 psi. The product is cooled to 45° F. and stored until used. The product is combined with proteolytic fermentate, lipolytic fermentate, and cultures obtained in accordance with Example 1.

The resulting cheese-like product has flavor and texture resembling that of cheddar cheese and this example illustrates how fats from vegetable sources can be substituted for cow's milk or milk fat. The example also illustrates how either a liquid oil or a hydrogenated high melt oil can be used.

In the foregoing disclosure and Examples, a new process for the manufacture of cheese and cheese-like products has been described which provides cheese flavor, body and texture more rapidly than known processes through the fermentation of minor fractions of milk products. These fractions comprise cheese flavor components and precursors for flavor and for development of body and texture characteristics in short periods of time. Further, the process of the invention provides greater control of the cheese making process while, at the same time, providing higher yields than conventional cheese making techniques. In addition, the disclosed process makes possible economies in the manufacture of cheese and cheese-like products in respect to storage of raw materials, processing steps, and avoidance of long curing times to develop body, texture and flavor.

The various features of the invention which are believed to be new are set forth in the following claims.

We claim:

1. In a process for the manufacture of cheese the steps of preparing a non-hydrolyzed milk protein composition which is substantially free of fermentable sugars and in which the protein and salts are capable of forming a stable matrix for fat, said milk protein composition being prepared by removing water and fermentable sugars from milk, separately preparing a hydrolyzed milk protein composition by treating a milk protein with a protease to hydrolyze this milk protein and to develop cheese flavor components and precursors therefor, mixing the hydrolyzed milk protein composition with said non-hydrolyzed milk protein composition, the hydrolyzed milk protein composition having a trichloroacetic acid soluble tyrosine in an amount between about 500 and about 3000 micrograms per milliliter and providing a minor portion of the protein in the cheese, adding a culture to the mixture, adding a coagulant to cause setting, breaking the set mixture to provide curd and whey, firming the curd by cooking, draining whey from the curd, and recovering and pressing the curd.

2. The process in accordance with claim 1, wherein the protein in said non-hydrolyzed milk protein composition is substantially in micellar form.

3. The process in accordance with claim 1, wherein the quantity of hydrolyzed milk protein constitutes between about 5 percent and about 50 percent of the total protein in the curd.

4. The process in accordance with claim 1, wherein the proteases are selected from proteases used in cheese making.

5. The process in accordance with claim 1, wherein the milk protein composition is prepared by ultrafiltration of milk to remove a major portion of the fermentable sugars and unbound salts.

6. The process in accordance with claim 1, wherein the fermentable sugars are present in the non-hydrolyzed milk protein composition at a level of greater than 2 percent by weight on a dry basis.

7. The process in accordance with claim 1, wherein in the milk protein composition the protein is present at a level between about 35 percent and about 80 percent and fat is present at a level between about 25 percent and about 50 percent, on a dry basis.

8. The process in accordance with claim 7, wherein at least 5 percent of the salts are complexed with the non-hydrolyzed protein.

9. The process in accordance with claim 1, wherein the milk protein composition is substantially dry and is reconstituted.

10. In a process in accordance with claim 1, in which the hydrolyzed milk protein is dry and is reconstituted.

11. In a process in accordance with claim 9, wherein the hydrolyzed milk protein is dry and is reconstituted.

12. In a process in accordance with claim 1, wherein the protein in said milk protein composition is substantially undenatured.

13. A process in accordance with claim 1, wherein the non-hydrolyzed milk protein composition is prepared from a material obtained by removing a major portion of fermentable sugars and unbound salts from dry milk solids.

14. In a process for the manufacture of cheese the steps of preparing a non-hydrolyzed milk protein composition which is substantially free of fermentable sugars and in which the protein and salts are capable of forming a stable matrix for the fat, said milk protein composition being prepared by removing water and fermentable sugars from milk, separately preparing a hydrolyzed milk protein composition by treating milk protein with a protease to hydrolyze this portion of milk protein and to develop cheese flavor components and precursors therefor, mixing the hydrolyzed milk protein with said milk protein composition, treating milk fat with a lipase to hydrolyze the milk fat and to develop cheese flavor components and precursors therefor, mixing the hydrolyzed milk fat with the said milk protein composition and said hydrolyzed milk protein composition, adding a culture to the mixture, adding a coagulant to cause setting, breaking the set mixture to provide curd and whey, firming the curd by cooking, draining whey from the curd, and recovering and pressing the curd.

15. A process in accordance with claim 14, in which the hydrolyzed milk fat comprises at least 5 percent of the fat in the product.

16. A process in accordance with claim 14, wherein the lipase is selected from lipases used in cheese making.

17. A process in accordance with claim 14, wherein the milk fat is in cream obtained from milk.

18. A process in accordance with claim 14, wherein milk is separated to provide said milk protein composition and cream, wherein a minor portion of said milk protein composition is separately hydrolyzed, and wherein a minor portion of the cream is separately hydrolyzed.

19. A process in accordance with claim 14 in which whole milk is treated to remove a major portion of the fermentable sugars and unbound salts to provide the milk protein composition.

20. A process in accordance with claim 19, wherein a minor portion of the treated whole milk is treated with proteases and lipases.

21. A process in accordance with claim 18, wherein the cream is dried and reconstituted.

22. A process in accordance with claim 13 wherein the protein in said milk protein composition is substantially in micellar form.

23. A process in accordance with claim 22 wherein the protein is substantially undenatured.

24. A process in accordance with claim 14 wherein the milk protein composition is prepared by ultrafiltration of milk to remove a major portion of the fermentable sugars and unbound salts.

25. A process in accordance with claim 14 wherein the non-hydrolyzed milk protein composition is prepared by separation of whole milk into skim milk and cream, wherein the skim milk is ultrafiltered to provide a retentate having a major portion of the fermentable sugars and unbound salts removed, and wherein the retentate is combined with the cream.

26. A process in accordance with claim 14, wherein an edible vegetable fat is added having an Iodine Value in excess of 70.

* * * * *

UNITED STATES PATENT AND TRADEMARK OFFICE
CERTIFICATE OF CORRECTION

PATENT NO. : 4,379,170
DATED : April 5, 1983
INVENTOR(S) : Hettinga et al.

It is certified that error appears in the above-identified patent and that said Letters Patent is hereby corrected as shown below:

Column 4, line 51, delete "addd" insert --added--.
Column 5, line 60, delete "chedar" insert --cheddar--.
Column 6, line 17, delete "row" insert --raw--.
Column 7, line 53, delete "to" insert --at--.
Column 8, line 22, delete "chedder" insert --cheddar--.
Column 8, line 56, delete "0.155%" insert --0.055%".
Column 10, line 10, delete "1" insert --2--.
Column 10, line 13, delete "0.002%" insert --0.001%--.

Signed and Sealed this

Twenty-fourth Day of January 1984

[SEAL]

Attest:

GERALD J. MOSSINGHOFF

*Attesting Officer*  *Commissioner of Patents and Trademarks*